United States Patent [19]

Bigcharles

[11] Patent Number: 4,979,671
[45] Date of Patent: Dec. 25, 1990

[54] AUTO THERMOSTAT

[76] Inventor: Donald Bigcharles, P.O. Box 423, Bellevue, Alberta T0K 0C0, Canada

[21] Appl. No.: 180,317

[22] Filed: Apr. 11, 1988

[51] Int. Cl.$^5$ .............................................. F01P 7/02
[52] U.S. Cl. ................................... 236/34.5; 137/599
[58] Field of Search .................. 236/34, 34.5, DIG. 2; 137/599, 599.2

[56] References Cited

U.S. PATENT DOCUMENTS

| | | | |
|---|---|---|---|
| 4,011,988 | 3/1977 | Inagaki | 236/34.5 |
| 4,052,965 | 10/1977 | Morris | 236/34.5 X |
| 4,431,133 | 2/1984 | Roberson, Sr. | 236/34.5 X |

Primary Examiner—William E. Tapolcai

[57] ABSTRACT

A simple bypass valve device for carrying a winter thermostat in an automotive cooling system obviates the need for seasonal thermostat changes. The valve device includes a casing defined by identical end portions and a ring rotatably mounted between the end portions for carrying the winter thermostat. The end portions and ring contain passages which can be placed in fluid communication in spring or summer by rotating the ring so that the winter thermostat is bypassed, and, in autumn or winter, removed from fluid communication by reverse rotation of the ring so that the winter thermostat is in the flow path of the coolant, which cannot flow therearound.

5 Claims, 3 Drawing Sheets

4,979,671

AUTO THERMOSTAT

BACKGROUND OF THE INVENTION

This invention relates to a valve device, and in particular to a valve device for use in an automotive cooling system.

In general, the thermostats used in automobiles are designed to operate at different temperatures, i.e. to open at different temperatures. While in summer, the thermostat opens at a low temperature, e.g. 160° F., in winter the thermostat operates at 195° F. For this reason, it is common practice to replace thermostats on a seasonal basis which requires opening or draining of the cooling system.

An object of the present invention is to overcome the above-defined problem by providing a relatively simple valve device, which can be used to carry a winter thermostat, and which permits bypassing of the winter thermostat except when the latter is required.

Another object of the invention is to provide a valve device which is easy to operate, placing the summer thermostat only or both the summer and winter thermostats in the coolant flow path.

BRIEF SUMMARY OF THE INVENTION

Accordingly, the present invention relates to a valve device for use with an automotive thermostat comprising casing means defining a chamber for carrying an automotive thermostat; inlet duct means in said casing means for introducing coolant into the chamber against one side of the thermostat; outlet duct means said casing means for discharging coolant from the chamber when the thermostat is open; ring means rotatably mounted in said chamber for receiving the thermostat and allowing the free flow of coolant therethrough; first passage means extending longitudinally of said ring means for carrying coolant therethrough between the upstream and downstream ends of the thermostat in the direction of coolant flow; and second passage means extending radially of said casing means at each end of said chamber, whereby, said ring means can be rotated between a closed position in which the first and second passage means are out of alignment and the flow of coolant around the thermostat is prevented, and an open position in which said first and second passage means are aligned, whereby coolant can bypass the thermostat and flow between said inlet and outlet duct means.

BRIEF DESCRIPTION OF THE DRAWING(S)

The invention will be described in greater detail with reference to the accompanying drawings, which illustrate a preferred embodiment of the invention, and wherein.

DESCRIPTION OF THE PREFERRED EMBODIMENTS

Figure 1:
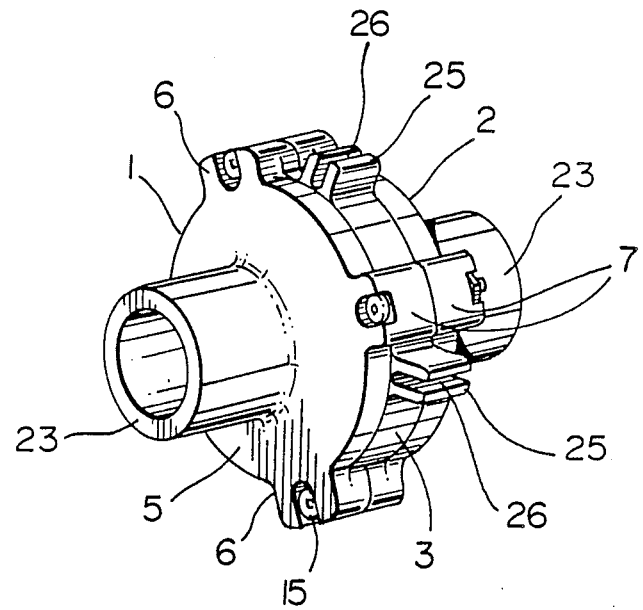
FIG. 1 is a perspective view of a valve device in accordance with the present invention.

With reference to the drawings, the valve device of the present invention includes a casing defined by identical portions 1 and 2, and a ring 3 for housing a winter thermostat 4. Each casing portion 1 and 2 is defined by an annular body 5 with arms 6 extending outwardly therefrom. The arms include portions extending beyond one surface of the body 5 to define flanges 7 for overlapping the ring 3. Holes 9 in the arms 6 receive bolts 10 and nuts 11 for interconnecting the portions 1 and 2, with the ring 3 sandwiched therebetween. Generally U-shaped recesses 13 are provided in the arms 6 for receiving either the heads 15 of the bolts 10 or the nuts 11 on the other ends of the bolts.

An outwardly tapering, central opening 16 is provided in each casing portion 1 and 2 for alignment with the opening 18 in the ring 3. One of the openings 16 receives the domed inlet end 19 of the thermostat 4. Radially extending recesses 20 are provided in the inner surface of the body 5. The recesses 20 are generally rectangular and communicate with the opening 16 for defining bypasses around the thermostat mounting plate 22 as described hereinafter in greater detail. A tube 23 integral with the body 5 acts as an inlet or outlet duct depending on the orientation of the ring 3 and the thermostat 4 in the casing.

Figure 2:
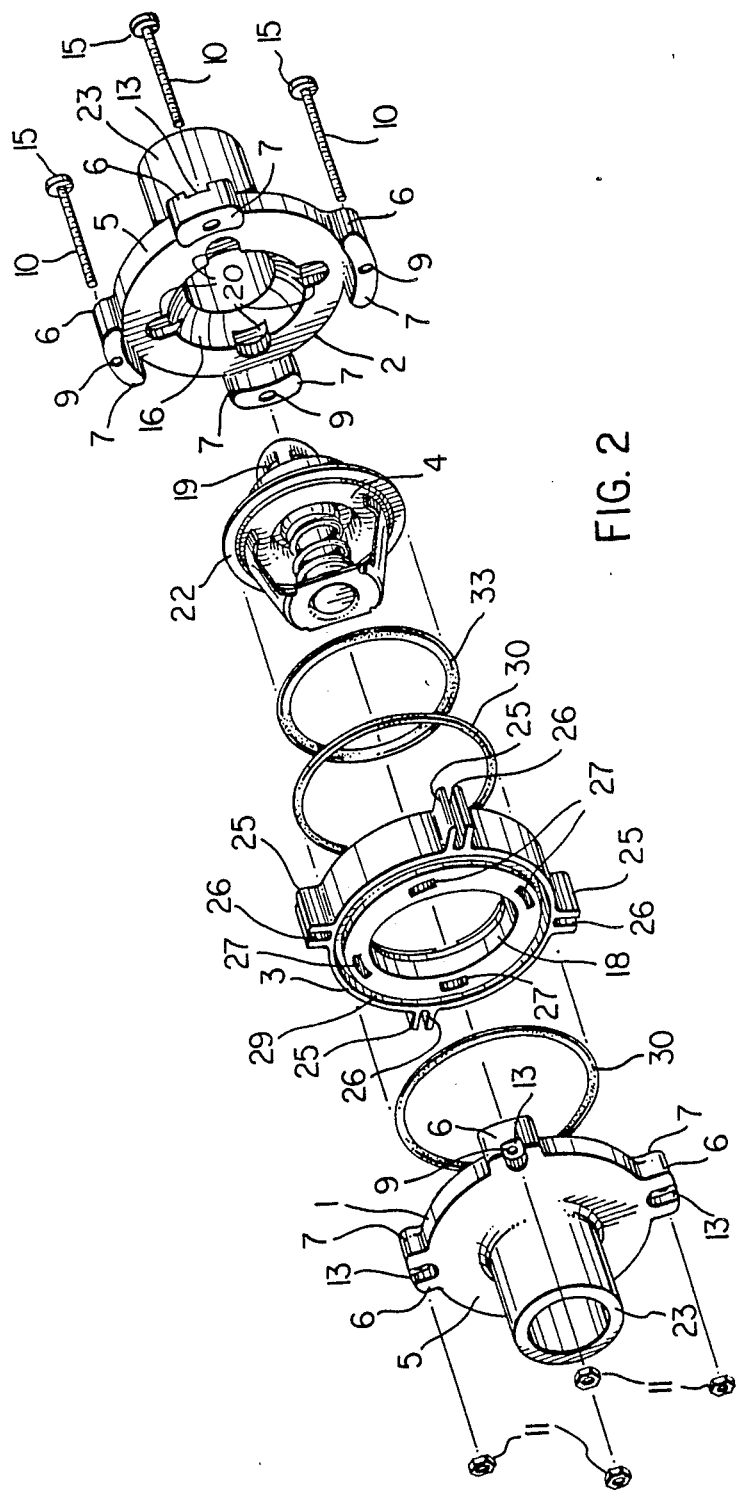
FIG. 2 is an exploded perspective view of the device of FIG. 1.
Figure 3:
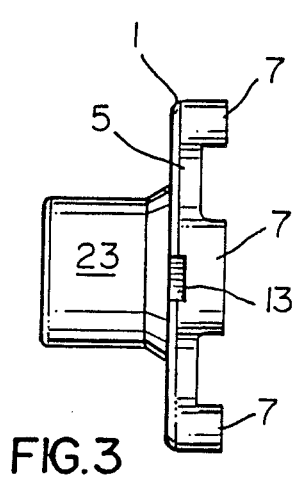
FIG. 3 is a side elevation view of a casing portion used in the device of FIGS. 1 and 2.
Figure 4:
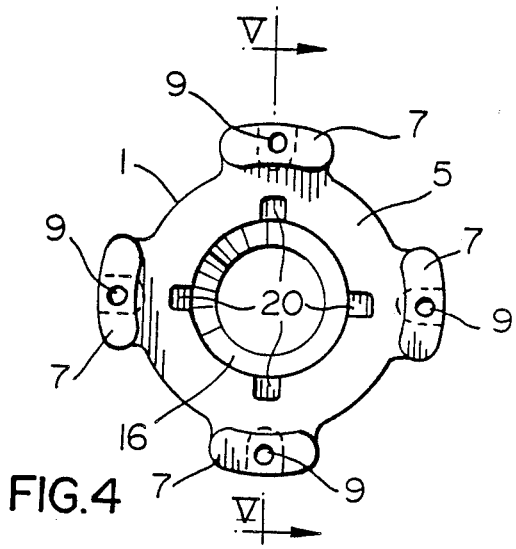
FIG. 4 is an end view of the casing portion of FIG. 3.
Figure 5:
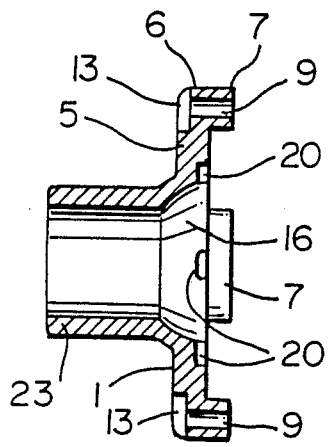
FIG. 5 is a cross section taken generally along line IV—VI of FIG. 4.
Figure 6:
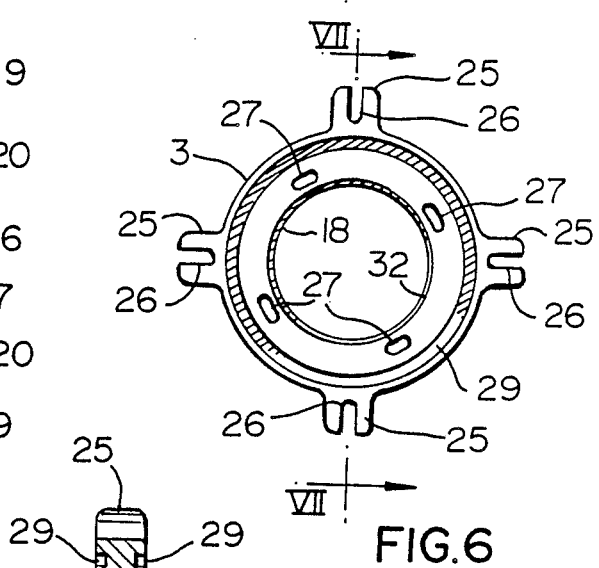
FIG. 6 is an end view of a ring used in the device of FIGS. 1 and 2.
Figure 7:
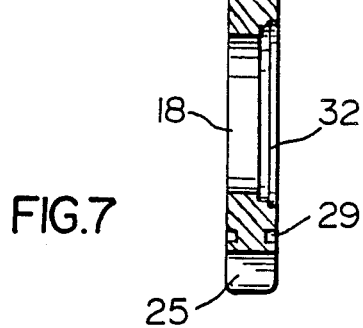
FIG. 7 is a cross section taken generally along line VII—VII of FIG. 6.

The ring 3 (FIGS. 2, 6 and 7) is defined by an annular body with four lugs extending outwardly therefrom. The lugs 25 are spaced equidistant apart, and include radially extending deep slots 26 for receiving a tool such as a screwdriver (not shown) for facilitating rotation of the ring 3. Four holes 27 extend longitudinally of the ring 3 for communicating with the recesses 20 when the ring 4 is properly positioned in the casing. Axially aligned annular grooves 29 are provided in the ends of the ring 3 near the outer edge thereof for receiving O-rings 30 (FIG. 2), which seal the ring with respect to the two Portions 1 and 2 of the casing, i.e. seal the casing with resPect to the atmosphere. An annular groove 32 (FIGS. 6 and 7) is provided around the opening 18 on one end of the ring 3 for receiving a smaller O-ring 33 and the mounting plate 22 of the thermostat 4.

In use, the thermostat 4 is mounted in the casing, and the casing is mounted in the top radiator hose (now shown) of an automobile by connecting one end of a severed hose or hose sections from the engine to the radiator on the ducts 23 of casing portions 1 and 2. The valve device is mounted as close to the engine as possible. Once the device has been installed, it will no longer be necessary to open or drain the cooling system of the automobile to make seasonal thermostat changes. A summer thermostat normally operating at 160° F. is mounted in the engine block, and a winter thermostat 4 normally operating at 195° F. is mounted in the device of the present invention.

For summer conditions, the disc 3 is rotated to a position in which the holes 27 in the ring 3 are aligned with the recesses 20 in the casing portions 1 and 2. Thus coolant entering the casing flows through the recesses 20 and the holes 27, bypassing the thermostat 4. For winter conditions when use of the thermostat 4 is required, the ring 3 is rotated so that the holes 27 are no longer aligned with the recesses 20 (the summer and winter positions can be marked on the casing). In the winter position of the ring 3, coolant cannot bypass the thermostat 4, and must be heated to the appropriate temperature to open the thermostat.

Thus, there has been described a relatively simple valve device for use in an automotive cooling system which is easy to install and even easier to operate.

What is claimed is:

1. A valve device for use with an automotive thermostat comprising casing means defining a chamber for carrying an automotive thermostat; inlet duct means in said casing means for introducing coolant into the chamber against one side of the thermostat; outlet duct means in said casing means for discharging coolant from the chamber when the thermostat is open; ring means rotatably mounted in said chamber for receiving the thermostat and allowing the free flow of coolant therethrough; first passage means in and extending longitudinally of said ring means for carrying coolant therethrough between the upstream and downstream ends of the thermostat in the direction of coolant flow; and second passage means in said casing means at each end of said chamber, said ring means being rotatable with respect to said casing between a first closed position in which the first and second passage means are out of alignment and the flow of coolant around the thermostat is prevented, and a second open position in which the first and second passage means are aligned and coolant can flow through said first and second passage means and between said inlet and outlet duct means.

2. A valve device according to claim 1, including a pair of identical portions defining body means, each said portion including an annular body and tube means integral with said body, the tube means defining one said duct means.

3. A valve device according to claim 2, including flange means on each said body for overlapping the ring means and interconnecting the portions.

4. A valve device according to claim 3, wherein said flange means includes a plurality of arm members spaced equidistant apart and extending radially outwardly from each said body.

5. A valve device according to claim 4, including lug means extending radially outwardly from said ring means between said arm means for facilitating rotation of said ring means in said body means.

* * * * *